United States Patent
Saiki et al.

(10) Patent No.: US 6,798,460 B2
(45) Date of Patent: *Sep. 28, 2004

(54) HIGH DEFINITION DISPLAY UNIT AND HIGH DEFINITION DISPLAY METHOD

(75) Inventors: Yukimi Saiki, Tokyo (JP); Masahisa Tsukahara, Fujisawa (JP); Toshimitsu Watanabe, Yokohama (JP); Kazuhiko Yoshizawa, Yokohama (JP)

(73) Assignees: Hitachi, Ltd., Tokyo (JP); Hitachi Video and Information System, Incorporated, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/367,686

(22) Filed: Feb. 19, 2003

(65) Prior Publication Data

US 2003/0147009 A1 Aug. 7, 2003

Related U.S. Application Data

(63) Continuation of application No. 10/108,643, filed on Mar. 29, 2002, now Pat. No. 6,563,546, which is a continuation of application No. 09/114,967, filed on Jul. 14, 1998, now Pat. No. 6,388,713.

(30) Foreign Application Priority Data

Jul. 14, 1997 (JP) .............................................. 9-188207

(51) Int. Cl.[7] .............................. H04N 5/44; H04N 5/46; H04N 5/57
(52) U.S. Cl. ........................ 348/553; 348/603; 348/687
(58) Field of Search ................................. 348/553, 558, 348/603, 687, 725, 180, 191, 649, 602, 564, 189, 190, 563, 569, 559, 708

(56) References Cited

U.S. PATENT DOCUMENTS

| 4,901,147 A | | 2/1990 | Tajima | |
|---|---|---|---|---|
| 5,191,421 A | * | 3/1993 | Hwang | 348/687 |
| 5,696,561 A | * | 12/1997 | Mizuno | 348/468 |
| 5,703,661 A | * | 12/1997 | Wu | 348/673 |
| 5,721,593 A | * | 2/1998 | Suh | 348/564 |
| 5,734,436 A | * | 3/1998 | Abe et al. | 348/564 |
| 5,774,187 A | * | 6/1998 | Tsunoda | 348/553 |
| 5,847,773 A | * | 12/1998 | Lagoni et al. | 348/603 |
| 5,912,663 A | * | 6/1999 | Cheng | 345/184 |
| 5,940,144 A | | 8/1999 | Lenz et al. | |
| 5,969,767 A | * | 10/1999 | Ishikawa et al. | 348/564 |
| 5,977,946 A | * | 11/1999 | Mizobata | 345/112 |

(List continued on next page.)

FOREIGN PATENT DOCUMENTS

| JP | 9-135371 | 5/1997 |
|---|---|---|
| JP | 9-139655 | 5/1997 |

Primary Examiner—Michael H. Lee
Assistant Examiner—Paulos Natnael
(74) Attorney, Agent, or Firm—Antonelli, Terry, Stout & Kraus, LLP

(57) ABSTRACT

A high definition display unit which demodulates, decodes, and processes in relation to chroma and displays a television signal in which a PI (picture) signal and an SI (service information) signal are mixed. A changeover switch 13 connected to an image quality adjusting circuit in a video chroma processing circuit 7 is opened or closed according to an on-off signal $S_1$ showing the superposed period of both signals detected by a decoder 4. If the above on-off signal $S_1$ is on, the changeover switch 13 is opened and the adjustment of image quality is disabled. Therefore, SI display never disappears due to the adjustment of image quality, and the quality of an image can be also adjusted according to an ambient status. Other approaches are also disclosed from preventing image quality adjustment of at least portions of a displayed image containing an information image.

6 Claims, 8 Drawing Sheets

U.S. PATENT DOCUMENTS

| | | | | |
|---|---|---|---|---|
| 5,978,046 A | * | 11/1999 | Shintani | 348/589 |
| 5,990,940 A | * | 11/1999 | Hashimoto et al. | 348/184 |
| 6,008,836 A | | 12/1999 | Bruck et al. | |
| 6,011,594 A | * | 1/2000 | Takashima | 348/565 |
| 6,388,713 B1 | * | 5/2002 | Saiki et al. | 348/553 |
| 6,563,546 B2 | * | 5/2003 | Saiki et al. | 348/553 |

* cited by examiner

HIGH DEFINITION DISPLAY UNIT AND HIGH DEFINITION DISPLAY METHOD

CROSS-REFERENCE TO RELATED APPLICATION

This application is a continuation of U.S. Ser. No. 10/108,643 filed Mar. 29, 2002, now U.S. Pat. No. 6,563,546 B1, which is a continuation of U.S. Ser. No. 09/114,967 filed Jul. 14, 1998, now U.S. Pat. No. 6,388,713).

BACKGROUND OF THE INVENTION

1. Field of the Invention

The present invention generally relates to a high definition display unit and method, and more particularly relates to a television receiver having an electronic program guide (EPG) or pay-per-view (PPV) function which is further provided with an arrangement for selectively enabling/disabling image quality adjustment of EPG or PPV menu portions of a display to insure a viewability thereof.

2. Description of Related Art

Referring to FIG. 6, one type television receiver will be described for background purposes. More particularly, FIG. 6 is a schematic block circuit diagram showing a television receiver arrangement. In FIG. 6, an analog input signal I including an analog picture signal (hereinafter called a PI signal) corresponding to a television signal, is received by an antenna 20 (or any other appropriate delivery mechanism, e.g., cable, infrared transmission, etc.). Such signal is then input to a demodulating circuit 3 via a tuner 1 and an IF circuit (not shown), passed through a decoder 5, and is ultimately processed in a video chroma processing circuit 7.

In addition, a portion P of information from the input signal is passed from the tuner 1 to a microprocessor M, and image information such as an EPG and/or pay-per-view (PPV) menus, that is, a service information (SI) signal in a form of a digital signal, is generated separately from the above PI signal by the microcomputer M or other separator arrangement. (The microprocessor also provides control signals to ones of the other illustrated components, such control signals not being further illustrated/described for sake of brevity and clarity of illustration/discussion.) Such SI signal is processed, amplified, and transmitted as an on-screen display signal. Therefore, with the FIG. 6 illustrated/described arrangement, a PI signal and an SI signal are demodulated separately.

The above separately demodulated PI signal and SI signal are superposed (e.g., added) with one another by a superposing section 10, are output to a display 11 via an output device 9, thus to be displayed. In the FIG. 6 television receiver, a quality of an image is adjusted by an image quality adjusting circuit 7a, e.g., within the video chroma processing circuit 7, using a user-variable adjustment part Ra. More particularly, a user adjusts with a control at a location before superposition by the superposing section 10, and therefore, the quality of the image and the quality of the image information (e.g., EPG and/or PPV) are completely independent from one another in this background arrangement, i.e., the user-variable adjustment of the display quality of the image does not affect the display quality of the image information owing to the fact that the image information is added to the image after the user-variable adjustment location.

In addition to the FIG. 6 arrangement, there are other methods for displaying an SI signal. For an on-screen circuit for displaying an SI signal, various methods are made practicable, i.e., there are a display character signal inserting circuit method of shunting a color output, and a method of a circuit and others for switching a Y input to a color output to an on-screen RGB and displaying an SI signal. Turning now to problems to be solved by the present invention, as a user cannot control an SI display in a system in which the above display of image information and the adjustment of the quality of an image are completely unrelated, there is a problem that an SI display may be rendered unreadable by luminance adjustment.

As further discussion, superposition of a PI signal and an SI signal in recent digital broadcasting corresponding television, for example, will be described. That is, the above PI signal and SI signal are mixed in a digital compression transmission mode such as in accordance with a Moving Picture Experts Group (MPEG) standard, and the mixed PI and SI signal is simultaneously transmitted or received via the antenna 20, is decoded by a digital decoder 4, the tuner 1 and the digital demodulating circuit 3, is processed by the video chroma processing circuit 7, is output and displayed. In this mode, the image quality is adjusted according to the above mixed signal by the video chroma processing circuit 7, i.e., both the PI and SI signal undergo image quality adjustment. There is a problem in this system in that an SI display may disappear or be rendered unreadable by the effect of the image quality adjusting circuit.

As digital broadcasting is tending to be increased in future, it is estimated that the control of SI information resulting in the disappearance of the SI display will be a more and more important problem.

SUMMARY OF THE INVENTION

The present invention is directed toward solving the problems in the above background art. More particularly, the object is to provide a high definition display unit which can prevent or limit a video chroma adjustment circuit from significantly adjusting an image quality of information image portions of a displayed image, such that an information image is never significantly degraded and/or rendered unviewable.

Numerous arrangements are possible for preventing or limiting such adjustment. More particularly, as one arrangement, a period in which the above both signals (i.e., PI and SI) are superposed is detected, and the image quality adjusting circuit is disabled according to the detection signal. In another arrangement, provided are a section for separating a picture information signal and a bypass circuit with respect to the video chroma processor, a superposed period of the above both signals (PI and SI) is detected, and the bypass circuit is operated according to the detection signal. In yet another arrangement, the superposed period of both signals (PI and SI) is detected and for the superposed period, the image quality adjusting circuit is adjusted according to level or value set according to a detection signal from a detector for detecting a brightness parameter. As a still further embodiment, the superposed period of the above both signals is detected, the image quality adjusting circuit is disabled for the superposed period, and an operating point of an output device is adjusted. Other arrangements are possible as disclosed within the detailed description ahead.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein.

DETAILED DESCRIPTION OF THE PREFERRED EMBODIMENTS OF THE INVENTION

Figure 1:
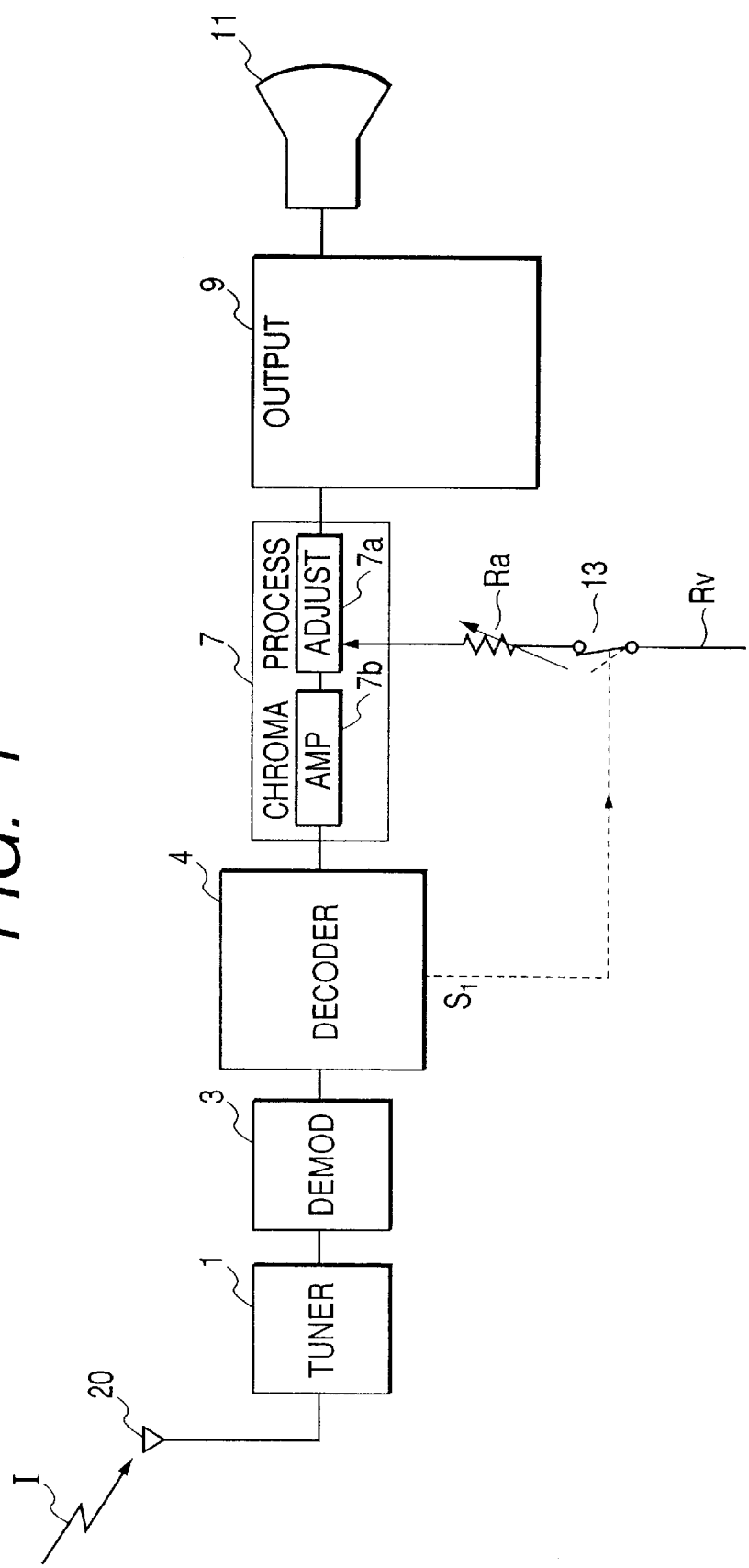
FIG. 1 is a schematic block diagram showing a high definition display unit equivalent to an embodiment of the present invention.

Before beginning a detailed description of the subject invention, mention of the following is in order. More particularly, when appropriate, like reference numerals and characters are used to designate identical, corresponding or similar components in differing figure drawings.

Figure 7:
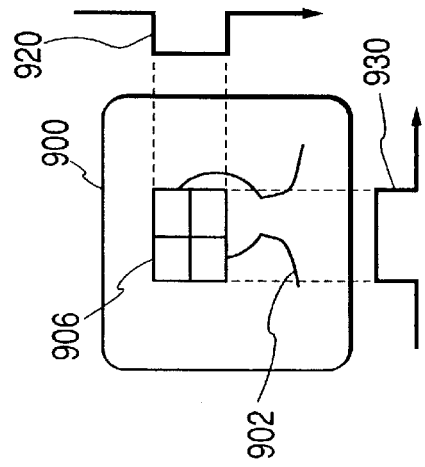
FIG. 7 is an illustration of a display containing a picture image and an information image generated internally within an apparatus.

As mentioned above, the invention is directed toward avoiding a situation where user adjustment of an image quality (e.g., color density, hue, and/or brightness) of a displayed image renders image (e.g., menu selection) information unviewable. With regard to the image information, the present invention is mainly directed toward improved/guaranteed viewability of image information having its original origin external from the apparatus, such as FIGS. 8A–8Ds' EPG or PPV menu 806 shown in contrast to a picture image 802. FIG. 7, on the other hand, is illustrative of image information having its origin within a display apparatus, e.g., internally generated channel image information 704 shown with respect to a picture image 702 within a display 700.

Figure 8D:
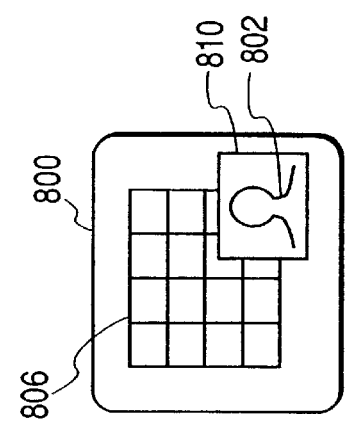
FIGS. 8A–8D are illustrations of a display containing various combinations of a picture image and an information image.
Figure 8C:
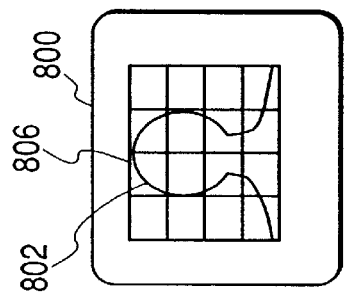
Figure 8B:
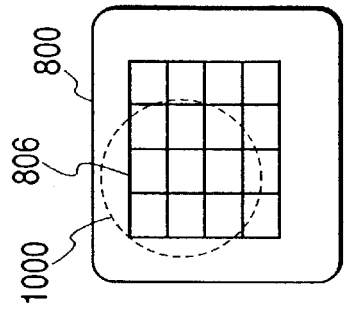
Figure 8A:
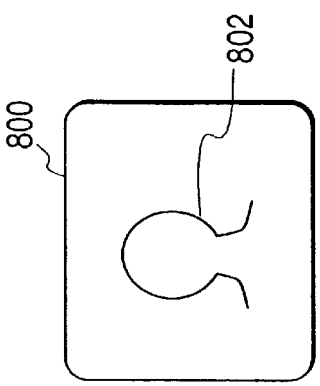
Figure 10:
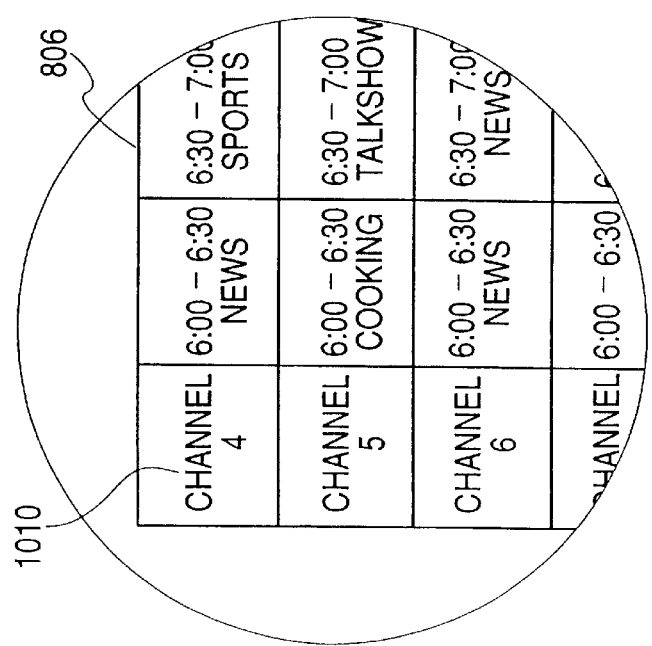
FIG. 10 is a magnified illustration of a portion of FIG. 8B, with respect to an information image.

Turning to more detailed discussion, FIGS. 8A–8D illustrate alternative modes of display possible with displaying picture (i.e., program) images and/or external-origin image (i.e., program menu) information. That is, FIG. 8A illustrates a display 800 displaying only a picture (i.e., program) image 802. FIG. 8B illustrates a display 800 displaying only image (i.e., program menu) information 806 (e.g., an EPG or PPV menu). More particularly, contents within a FIG. 8B dashed circle 1000 is shown in enlarged form in FIG. 10, i.e., the image (i.e., program menu) information 806 includes textual image information 1010 such as "CHANNEL 4", "6:00–6:30 NEWS", ETC. FIG. 8C illustrates a display 800 displaying a picture image 802 and image information overlapped (i.e., superposed). FIG. 8D illustrates a display 800 displaying a picture-in-picture window 810 (having a picture image 802) and image information overlapped (i.e., superposed). Accordingly, apparatuses of the present invention are adapted to selectably display at least two of: a picture image without an information image; an information image without a picture image; and, a picture image simultaneously with an information image. That is, the present invention is directed toward preventing user-adjustment of image quality from disadvantageously degrading a viewability of externally-origined image (e.g., program menu) information in any type of display mode, i.e., whether such image information is superposed with a picture image or displayed alone.

Figure 2:
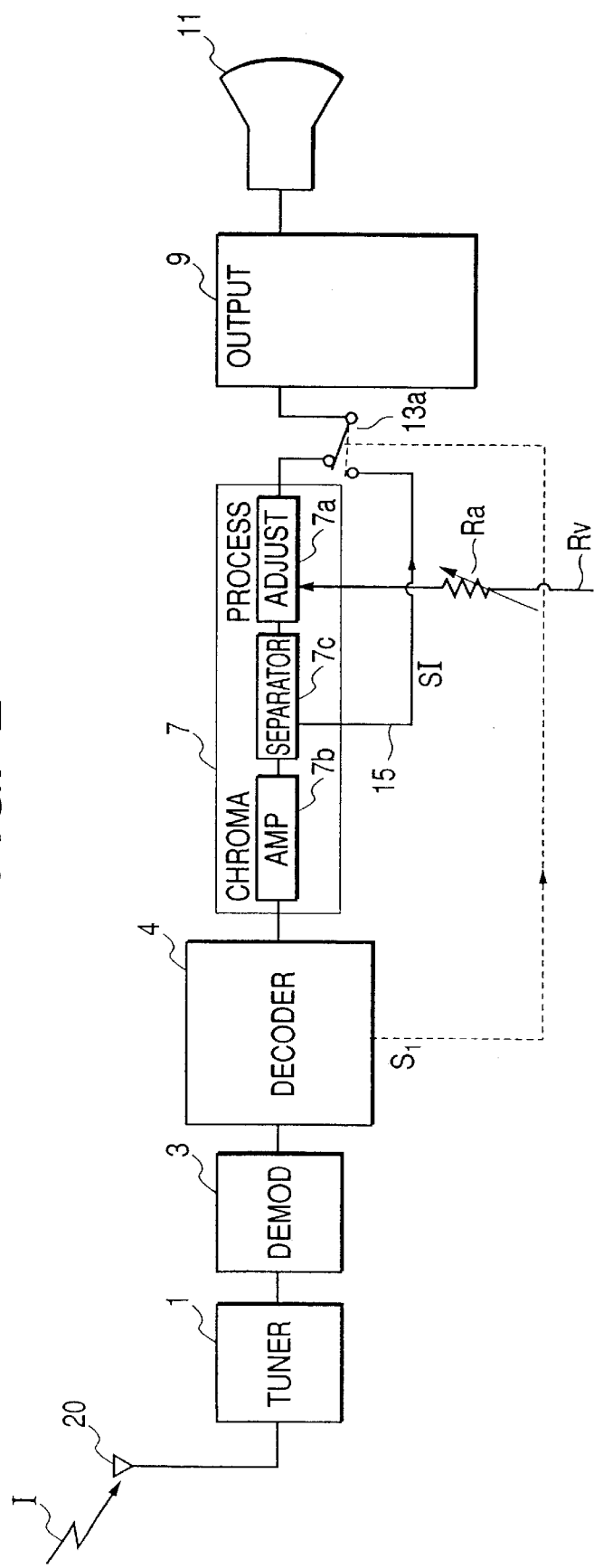
FIG. 2 is a schematic block diagram showing a high definition display unit equivalent to an embodiment of the present invention.
Figure 3:
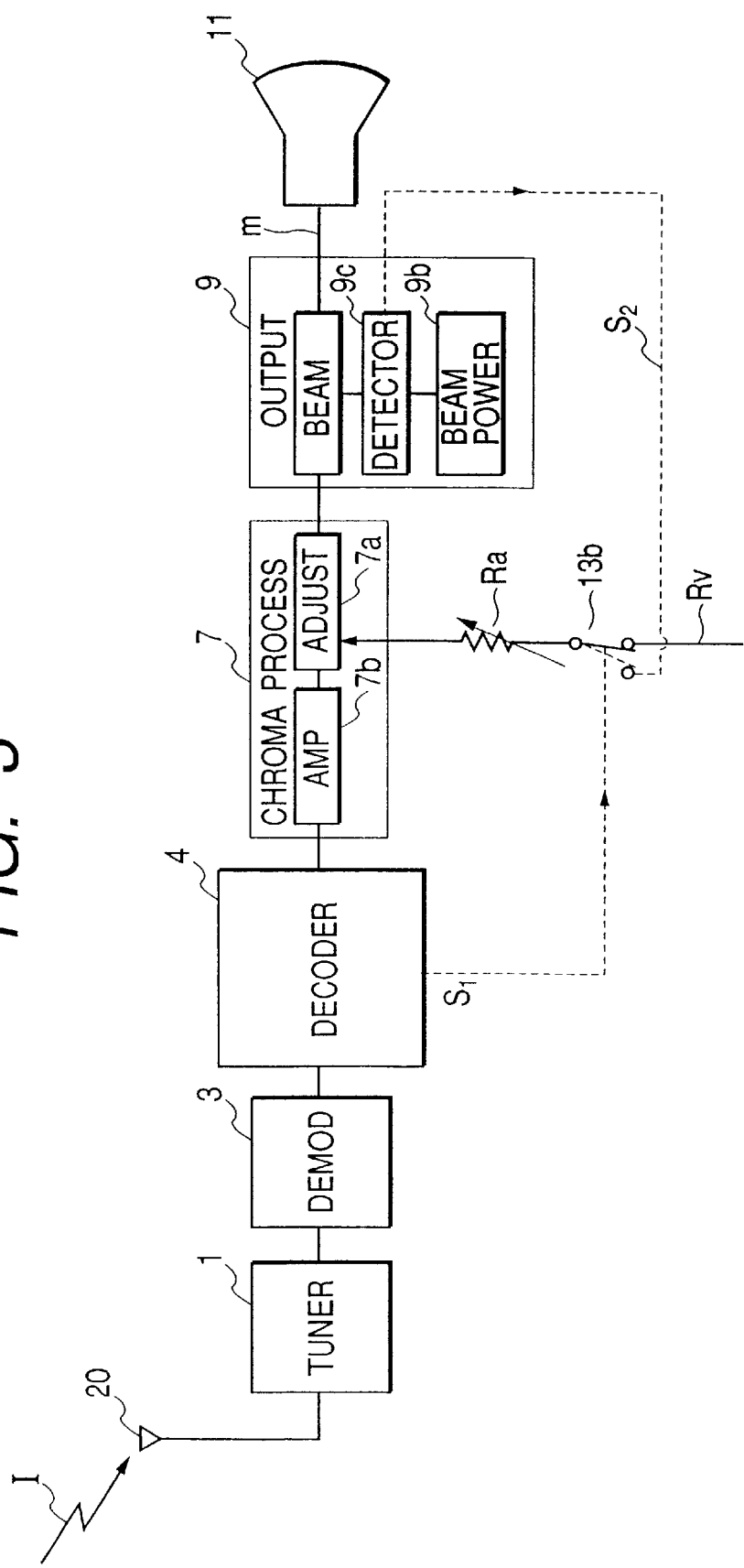
FIG. 3 is a schematic block diagram showing a high definition display unit equivalent to an embodiment of the present invention.
Figure 4:
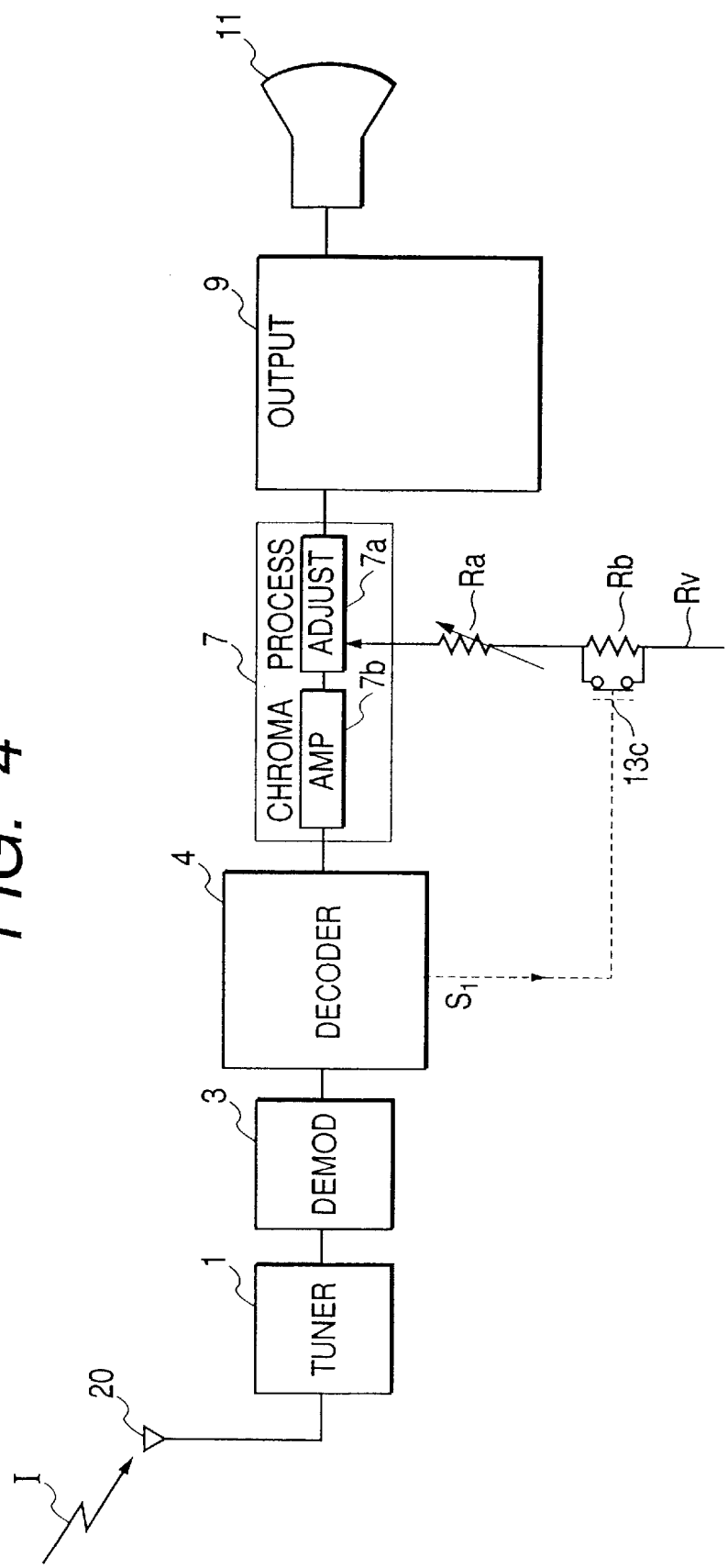
FIG. 4 is a schematic block diagram showing a high definition display unit equivalent to an embodiment of the present invention.
Figure 5:
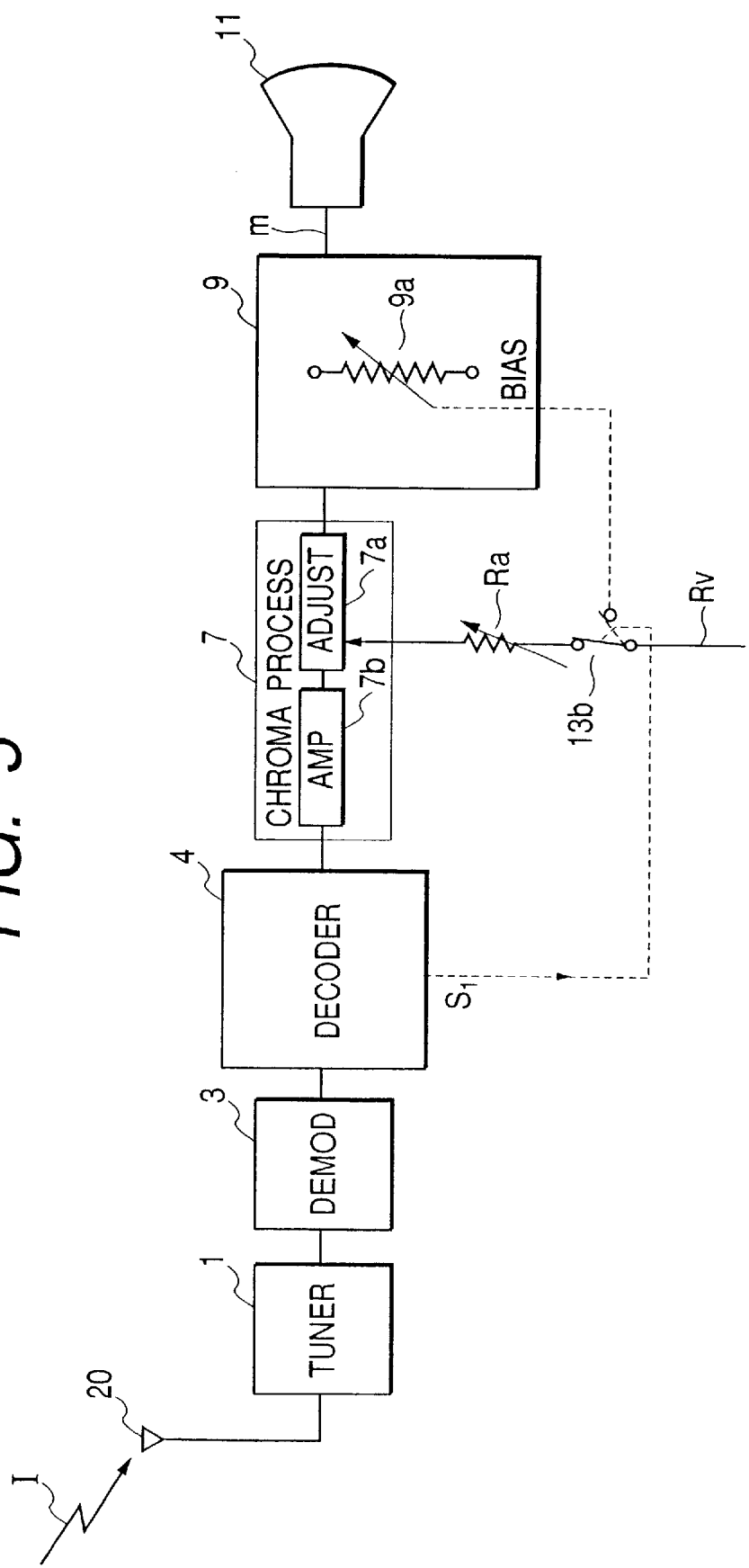
FIG. 5 is a schematic block diagram showing a high definition display unit equivalent to an embodiment of the present invention.
Figure 6:
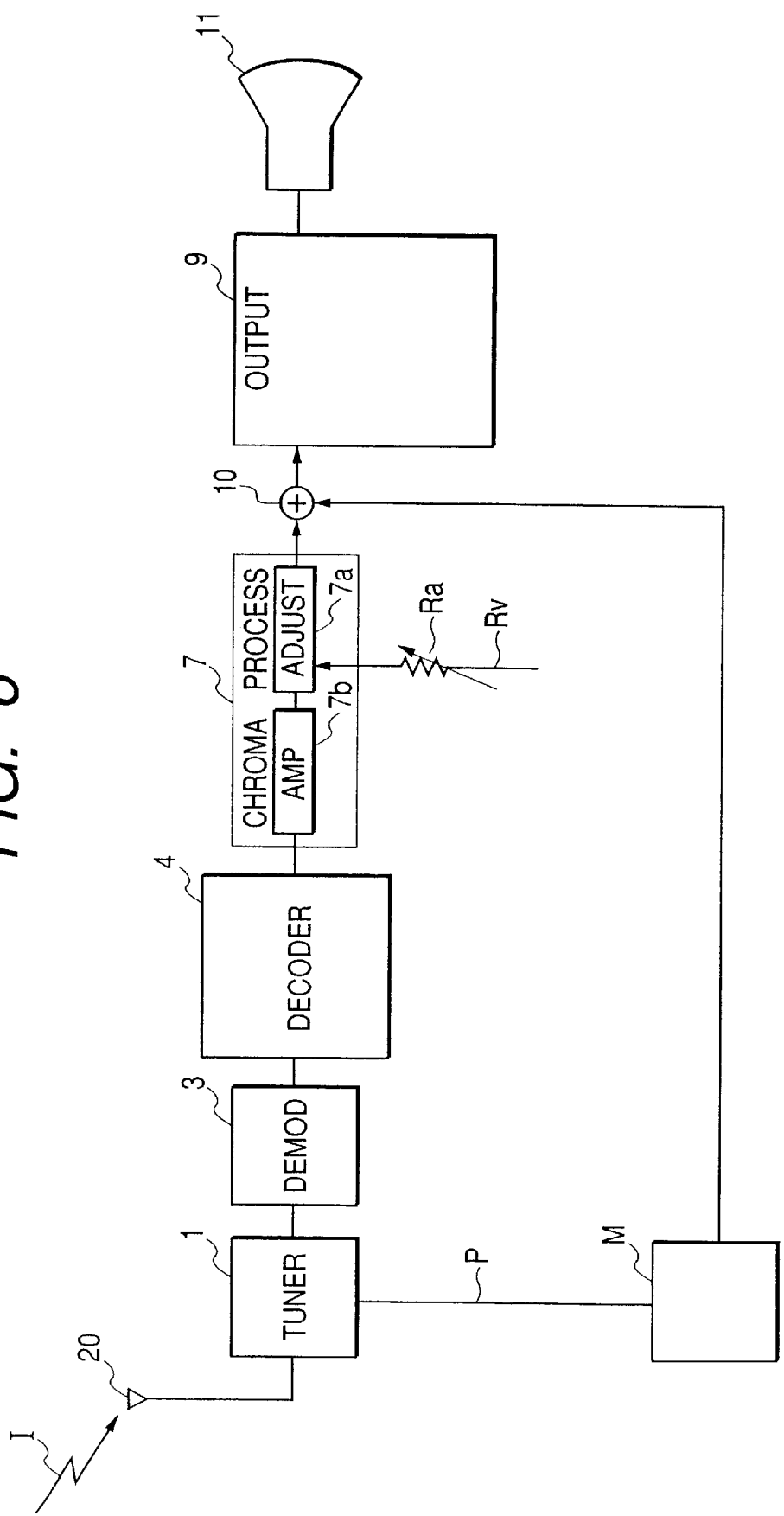
FIG. 6 is a schematic block diagram showing a background type television receiver.

Turning now to further detailed description, referring to FIGS. 1 to 5, each embodiment of the present invention will be described below. More particularly, as an overview, FIG. 1 is a schematic block diagram showing a high definition display unit equivalent to a first embodiment of the present invention, FIG. 2 is a schematic block diagram showing a high definition display unit equivalent to a second embodiment of the present invention, FIG. 3 is a schematic block diagram showing a high definition display unit equivalent to a third embodiment of the present invention, FIG. 4 is a schematic block diagram showing a high definition display unit equivalent to a fourth embodiment of the present invention, and FIG. 5 is a schematic block diagram showing a high definition display unit equivalent to a fifth embodiment of the present invention.

As shown in FIG. 1, a reference number 1 denotes a tuner, a reference number 3 denotes a digital demodulator, a reference number 4 denotes a digital decoder, a reference number 7 denotes a video chroma processing circuit, a reference number 7a denotes an image quality adjusting circuit, a reference number 7b denotes an image amplifier, a reference number Ra denotes an adjusting section circuit adjusted by a user (i.e., so as to vary an image quality of a displayed image), a reference number 9 denotes an output circuit, a reference number 13 denotes a circuit changing switch, a reference number 20 denotes an antenna, and a reference number $S_1$ denotes an on-off (e.g., high-level/low-level) signal indicative of (i.e., corresponding to) superposed/non-superposed periods of a PI signal and an SI signal as detected by an appropriate component, e.g., the digital decoder 4. The adjusting section circuit, for example, receives a predetermined reference level (e.g., a reference voltage) as indicated by the input arrow Rv, and allows a user (e.g., via a variable resistor) to select a portion of such reference level to be applied to the image quality adjusting circuit 7a so as to vary image quality.

As shown in FIG. 1, an input signal I in which a PI signal and an SI signal (which, for example, have been processed according to discrete cosine transform (DCT), quantized and encoded by a sender) are mixed within an input received by the antenna 20. As one example of suitable signal transmission/reception, even if a super high frequency (SHF) in the band of 12 GHz is used for a transmission television signal, such can be generally received by a parabolic antenna 20 to 30 cm in diameter. Alternative acceptable approaches for signal transmission/reception (useable with the present invention) would include cable television (CATV), optical transmission/reception, etc.

A television signal (i.e., channel) of interest is selected from a signal supplied from the antenna 20, is amplified and the frequency is then converted by the tuner 1. For the tuner 1, an electronic tuner for electronically switching a synchronizing frequency using a variable capacity diode of an LC oscillation circuit and a switching diode for switching the level of the LC oscillation circuit, is used.

The synchronization or delay of the above PI signal and SI signal, each frequency of which is converted, is detected by the digital demodulator 3, and both signals are demodulated with respect to a predetermined transmission digital modulation mode, for example, VSB, ASK, FSK, PSK, QAM, and FDM. In addition, any transmission error caused by a distorting effect from an external device in transmission is also corrected.

As modulated digital signals, both a PI signal and an SI signal are input to the digital decoder 4 in the form of, for example, packet data structure according to an MPEG standard, or any other form such that both can be discriminated. As examples, other types of suitable packet data structures useable with the present invention include: MPEG-2. The digital decoder 4 decodes a PI signal and an SI signal, the frequency of the decoded PI signal is converted for every static signal and every dynamic signal, is converted to an analog signal by a D/A converter (not shown), and is output as signals Y, U, and V (not shown separately).

In the meantime, an SI signal such as an EPG signal is superposed with the PI signal, and is output together therewith. In addition to superposition and outputting, the superposition period of the PI signal and the SI signal is detected by the digital decoder 4 according to a timing and analysis of the packet data structure, and a result of superposed period detection is output to an external device as an on-off signal $S_1$, e.g., the on-off signal $S_1$ can be a high-level/low-level signal, with a high-level being indicative of periods of superposition of the PI and SI signals, and with a low-level being indicative of periods of non-superposition of the PI and SI signals.

Figure 11:
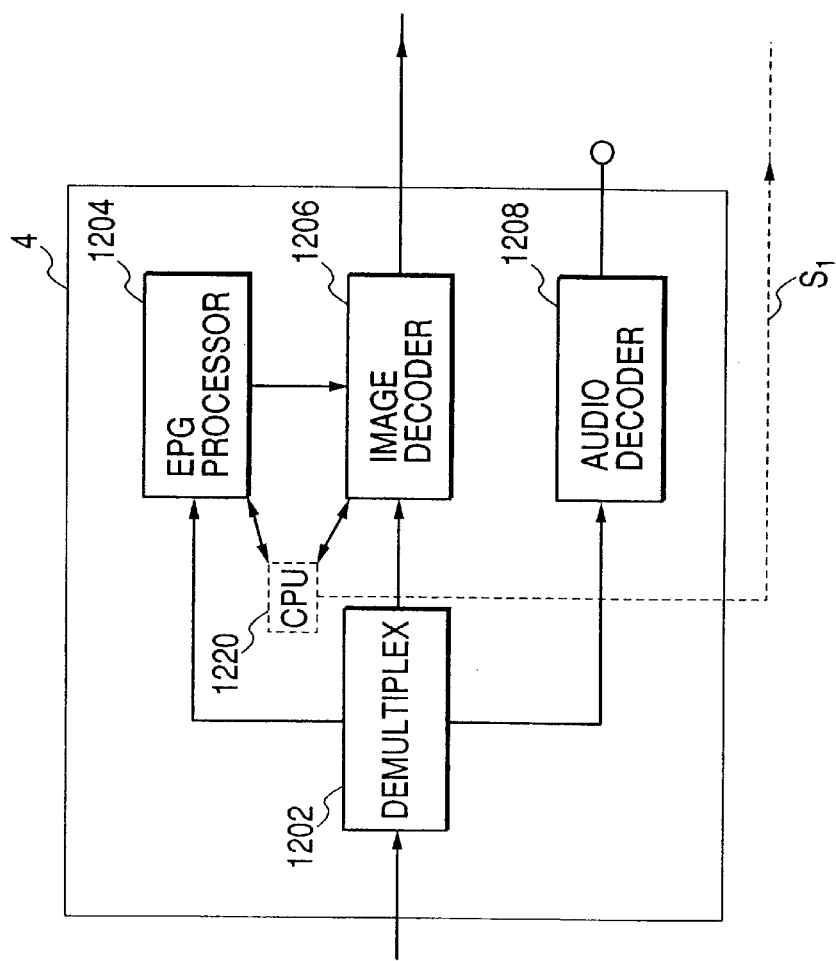
FIG. 11 is block diagram illustrating more detailed components of a decoder.

More particularly, FIG. 11 illustrates one exemplary arrangement of the digital decoder 4. A demodulated signal from the demodulator 3 is input to the digital decoder, to be demultiplexed within a demultiplexer 1202. The demultiplexer 1202 demultiplexes the signal into audio data provided to an audio decoder 1208 and then an audio output terminal (not further described within the present disclosure), image data provided to an image decoder 1206, and EPG data provided to an EPG processor 1204. The EPG processor 1204 then provides processed EPG data to the image decoder 1206. The image decoder 1206 decodes the input image data and EPG processed data to generate (in real time), one of a PI signal, an SI signal or a PI signal superposed with an SI signal, and outputs Y, U and V signals.

In addition to the above operations, a central processing unit (CPU) 1220 may be included as an internal component of the digital decoder 4, but preferably is a CPU external to the decoder and shared in common by several of the FIG. 1 components. The CPU 1220 provides control (e.g., processing, decoding parameters) to the EPG processor 1204 and image decoder 1206 (as well as other circuits), and also receives data (e.g., timing data, etc.) from the EPG processor 1204 and image decoder 1206. One of the EPG processor 1204, image decoder 1206 and CPU 1220 generates the on-off signal $S_1$.

The Y, U and V signals from the digital decoder 4 are input to the video chroma processing circuit 7. In the video chroma processing circuit 7, the inputted signals Y, U and V are amplified via amplifier 7b, and are ultimately output as signals R, G and B via the image quality adjusting circuit 7a composed of a color density adjusting circuit, a hue adjusting circuit, and/or a brightness adjusting circuit, respectively (such circuits not being illustrated individually). A signal from the video chroma processing circuit 7 is further processed (e.g., further amplified) in the output circuit 9, to be finally delivered to a display 11 such as a cathode ray tube.

The viewing quality of an image is adjusted by adjusting the amplification degree of the color density adjusting circuit, the hue adjusting circuit, and/or the brightness adjusting circuit under user control using the adjusting part Ra. However, in order to avoid a situation where user adjustment can disadvantageously degrade a viewing quality of displayed image information (e.g., a menu, an EPG and/or PPV information), a changeover switch 13 is provided relative to the user control (i.e., adjustment) circuit, and is automatically operated according to the on-off signal $S_1$ which is indicative of whether or not the PI and SI signals are superposed or not.

After the chroma processing circuit 7, a color difference signal is converted to a beam current by the output circuit 9, is delivered to an image receiving circuit via a synchronization/deflection circuit, and an image is thus formed with the display 11.

The function of the high definition display unit constituted as described above will be described below. More particularly, in the high definition display unit, an on-off signal $S_1$ indicative of superposed/non-superposed periods of a PI signal and an SI signal is detected under timing control in the digital decoder 4. As described above, the changeover switch 13 is provided within the user control circuit connected to the image quality adjusting circuit 7a in the video chroma processing circuit 7 via an adjustment part Ra. If the above on-off signal $S_1$ is on (e.g., at a high level) indicating both signals are presently superposed, the above switch 13 is operated on the left side in FIG. 1 (i.e., is opened) such that the user control circuit is disabled to prevent the density of a color, hue and luminance of superposed signals from being controlled by user control. Since user control (i.e., adjustment) of image quality is thus temporarily disabled, image quality is performed at a predetermined level (e.g., preset within the adjustment circuit 7a) rather that at a user-adjusted level, so as to guarantee a viewability of the image information (i.e., menu, EPG or PPV). If the above on-off signal $S_1$ is off (e.g., at a low-level) indicating both signals are not presently superposed, the above switch 13 is operated on the right side in FIG. 1 (i.e., is closed) and the user control arrangement is enabled to allow the density of a color and luminance to be controlled by normal user control.

As described above, if an SI signal exists, user control is disabled. Therefore, since adjustment of image quality by the adjustment is prevented from affecting the image quality of the SI signal, the display of an SI signal on the screen is not disadvantageously affected, i.e., does not become difficult to view and/or disappear altogether. A high definition display unit according to the present invention is not limited to the high definition display unit described in relation to FIG. 1 showing the above first embodiment, i.e., there are many other embodiments and any is included in the technical concept of the present invention. As non-exhaustive examples, referring to FIGS. 2 to 5, some of the other embodiments will be described below.

Referring to FIG. 2, another or second embodiment of a high definition display unit according to the present invention will be described. More particularly, as shown in FIG. 2, in a high definition display unit, a separator part 7c is provided to a front stage of (i.e., before) the image quality adjusting circuit 7a, and a PI signal and an SI signal are separated (i.e., further demodulated) in the separation part 7c. Further, a changeover switch 13a is provided between the video chroma processing circuit 7 and an output circuit 9, and the bypass circuit 15 of an SI signal is provided between the separation part 7c and one terminal of the changeover switch 13a.

In the above construction, when an on-off signal $S_1$ is on (e.g., at a high-level) indicating a superposed period detected in the digital decoder 4 under timing control (note that such on-off signal $S_1$ can alternatively be detected/generated by other suitable components other than the digital decoder 4, e.g., by the separator 7c), the changeover switch 13a is switched to the lower side shown by a dashed line in FIG. 2, such that the bypass circuit 15 is connected to the output device 9, and only an SI signal is input to the output device 9 via the bypass circuit 15 and switch 13a. Therefore, the SI signal bypasses the adjustment circuit 7a so as not to be adjusted thereby, and a display of an SI signal thus is not disadvantageously affected by the adjustment circuit 7a, e.g., a menu, EPG or PPV information is never rendered unreadable and/or never disappears.

If the above on-off signal $S_1$ is off (e.g., at a low-level), the changeover switch 13a is switched to the upper side shown by a full line in FIG. 2, and thus the bypass circuit 15 is disconnected from the output circuit 9 while an output from the adjustment circuit 7a is connected, and only a PI signal is input to the output device 9 via the switch 13a. Accordingly, while operating in such configuration, the quality of an image can be adjusted under normal user control by adjusting an adjustment part Ra.

Figure 9:
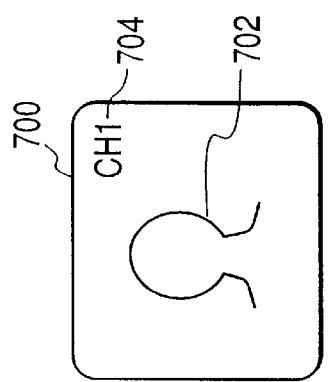
FIG. 9 is an illustration of a display containing a picture image superposed by an information image, and timings related thereto.

FIG. 9 is exemplary of a situation wherein user adjustment is enabled for a major portion of a displayed image, while being disabled for sub-portion of a displayed image, such sub-portion corresponding to an image information portion of the displayed image. More particularly, a display 900 illustrates a picture image 902 being superposed by an information image 906 window. In this embodiment, the user adjustment circuit is normally enabled, unless a predetermined situation is encountered. More particularly, vertical periods 920 and horizontal periods 930 are detected using any well know window period detection method. Such vertical periods 920 and horizontal periods 930 are then used, e.g., via combination with an AND gate, to determine periods when the user adjustment circuit should be disabled. Thus, while the user adjustment circuit is normally enabled during a majority of image display, the user adjustment circuit would be disabled during the information image 906 window.

Referring to FIG. 3, a further embodiment of a high definition display unit according to the present invention will be described. As shown in FIG. 3, provided is a detector 9c which detects a brightness parameter of a display image signal via an output beam current from a beam power device 9b (or some other parameter of the output device), and provides a predetermined detection value $S_2$ related in level or value to a level or value of the above output beam current m. A changeover switch 13b provided within the user adjustment circuit is operated according to an on-off signal $S_1$ indicative of the superposed/non-superposed periods. If the above on-off signal $S_1$ is on (e.g., at a high level), the changeover switch 13b is switched to the left side shown by a dotted line in FIG. 3. That is, the switch is selected to a position in which the adjustment part Ra is connected with, and thus adjusted according to, a level of the detection value $S_2$ as output by the detector 9c and related to the above output beam current m. That is, an actual brightness is used in setting an adjustment with the image quality adjusting circuit 7a. With such embodiment, an adjustment of a screen according to an ambient status is enabled. Accordingly, since adjustment is limited by and/or takes into account an actual brightness (i.e., via feedback using the $S_2$ signal), a display of an SI signal thus is not disadvantageously affected (i.e., degraded) by the adjustment circuit 7a, e.g., a menu, EPG or PPV information is never rendered unreadable and/or never disappears.

In contrast to the above operation, if the above on-off signal $S_1$ is off (e.g., at a low level), the changeover switch 13b is switched to a selection position shown by a full line in FIG. 3. That is, is switched to a position in which the adjustment part Ra does not receive the detection value $S_2$, but instead is connected to allow adjustment solely via user control. More particularly, with such switched configuration the adjustment part Ra for the image quality adjusting-circuit 7a is adjusted under normal user control.

Referring to FIG. 4, yet another embodiment of a high definition display unit according to the present invention will be described. That is, as shown in FIG. 4, an adjustable (resistance) part Ra and a fixed (resistance) part Rb are both provided within a user adjustment circuit, and the adjustment range of the image quality adjusting circuit 7a can be selected to any of two different ranges, i.e., one range defined by use of the adjustable (resistance) part Ra solely, and one range defined by use of a series combination of the adjustable (resistance) part Ra and the fixed (resistance) part Rb. As a further construction to facilitate such selection, a short circuiting switch 13c is provided with respect to the fixed part Rb, and is operated according to an on-off signal $S_1$ indicative of the presence/absence of a superposed period.

More particularly, if the above on-off signal $S_1$ is on (e.g., at a high level, and indicative of superposition), the short-circuiting switch 13c is switched to the left side shown by a dashed line in FIG. 4. That is, is switched to an unconnected (or non-shunting) position, and the adjustment part Ra and the fixed part Rb operate in a series combination. Therefore, the adjustment range of the image quality adjusting circuit 7a is limited by the series combination of the adjustment part Ra and the fixed part Rb. With such arrangement, the series combination is chosen such that degradation of superposed information images on a screen by the adjustment of image quality is never caused.

As a contrasting operation, if the above on-off signal $S_1$ is off (e.g., is at a low level, and indicative of non-superposition), the short circuiting switch 13c is switched to the right side shown by a full line in FIG. 4. That is, is switched to an ON state, to have the fixed part Rb short-circuited such that the image quality adjusting circuit 7a is adjusted only by the adjustment part Ra under normal user control.

Referring next to FIG. 5, another embodiment of a high definition display unit according to the present invention will be described. As shown in FIG. 5, a changeover switch 13d is provided within a user adjustment circuit, the fixed contact of the changeover switch 13d is connected to one terminal of user control, one of switching contacts of the changeover switch 13d is connected to the adjustment part Ra, and the other switching contact is connected to a bias circuit 9a in an output circuit 9.

If an on-off signal $S_1$ is on (i.e., at a high-level) indicative of a superposed period, the changeover switch 13d is switched on the right side shown by a dashed line in FIG. 5, wherein the adjusting resister Ra is disabled, and an operating point of the output device 9 is adjusted by applying a predetermined value (via the switch 13d) to a bias circuit 9a (within the output device 9), such that a beam current varies in accordance with the predetermined value, and the whole image (including the PI signal and SI signal) is adjusted. Therefore, with the FIG. 5 embodiment, the display of SI information is never disadvantageously affected or erased by the adjustment of image quality, and the adjustment of a screen according to an ambient status is also enabled.

If, with the FIG. 5 arrangement, the on-off signal $S_1$ is off (i.e., at a low-level), the changeover switch is switched to the right side shown by a full line in FIG. 5 and the image quality adjusting circuit 7a in the video chroma processing circuit 7 is enabled to allow adjusting of the adjustment part Ra and thus image appearance/quality, under normal user control.

The operating point of the output device 9 may also be adjusted using a self-holding mechanism not shown according to an on-off signal $S_1$ showing a superposed period.

As described in detail above, according to the present invention, if a PI signal and an SI signal are superposed, a high definition display unit which enables controlling (i.e., image appearance/quality adjustment) of an SI signal independent of a PI signal, e.g., according to an ambient status. Thus, a high definition receive arrangement and method can be provided.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, uses with alternative components will also be apparent to those skilled in the art.

What is claimed is:

1. A digital television receiver comprising:
   a tuner which receives a digital television signal including a picture information signal and a service information signal;
   a digital demodulator which demodulates the received picture information signal and the service information signal;
   a digital decoder which decodes the demodulated picture information signal and the service information signal, the digital decoder which outputs a control signal (Si) indicating a superposition period of the picture information signal and the service information signal;
   a display circuit which overlays and displays a first image according to the decoded picture information signal and a second image according to the decoded service information signal;
   an user adjustment control circuit allowing user adjustment of an image quality of a displayed image; and
   a disabler which prevents the user adjustment by the user adjustment control circuit during the overlaying period based on the control signal outputted from the digital decoder.

2. A digital television receiver as claimed in claim 1, wherein the digital decoder includes a service information processor for processing a service information data corresponding to the demodulated service information signal, an image decoder for decoding the processed service information data and an image data corresponding to the demodulated picture image signal, and CPU for controlling the service information processor and the image decoder, the control signal (Si) is generated and outputted by the CPU.

3. A digital television receiver as claimed in claim 2, wherein said service information signal includes at least a signal of an electronic program guide.

4. A digital television receiver comprising:
   a tuner which receives a digital television signal including a picture information signal and a service information signal;
   a digital demodulator which demodulates the received picture information signal and the service information signal;
   a digital decoder which decodes the demodulated picture information signal and the service information signal, the digital decoder which outputs a control signal (Si) indicating a superposition period of the picture information signal and the service information signal;
   a display circuit which overlays and displays a first image according to the decoded picture information signal and a second image according to the decoded service information signal;
   an user adjustment control circuit allowing user adjustment of an image quality of a displayed image; and
   a limiter which limits the user adjustment by the user adjustment control circuit during the overlaying period based on the control signal outputted from the digital decoder.

5. A digital television receiver as claimed in claim 4, wherein the digital decoder includes a service information processor for processing a service information data corresponding to the demodulated service information signal, an image decoder for decoding the processed service information data and an image data corresponding to the demodulated picture image signal, and CPU for controlling the service information processor and the image decoder, the control signal (Si) is generated and outputted by the CPU.

6. A digital television receiver as claimed in claim 5, wherein said service information signal includes at least a signal of an electronic program guide.

* * * * *